Patented Aug. 7, 1945

2,381,073

UNITED STATES PATENT OFFICE 2,381,073

ESTERS OF INORGANIC ACIDS AND PROCESS OF MAKING SAME

Karl Miescher, Riehen, and Charles Meystre, Basel, Switzerland, assignors to Ciba Pharmaceutical Products Inc., Summit, N. J., a corporation of New Jersey No Drawing. Application June 15, 1942, Serial No. 447,150. In Switzerland July 21, 1941

6 Claims. (Cl. 260—397.5)

It has been found that esters of inorganic acids can be obtained if poly-hydroxy compounds having the action of a sex hormone, which have been partially esterified or etherified, are treated with esterifying agents which are capable of introducing inorganic acid radicals. The mixed esters of organic and inorganic acids or ether-esters obtained may then be partially split and the esters produced, which still contain free acid groups, be converted into salts.

Suitable starting materials for the new process are, in general, saturated or unsaturated poly-hydroxy compounds which have the action of a sex hormone and are partially esterified with organic acids or etherified with alcohols or phenols; they may be of any steric configuration. As examples may be given: estradiol, estriol, androstanediol, androstenediol, poly-hydroxy compounds of the dialkyl-stilbene series, of the diphenyl-dialkyl ethane series or the diphenyl-dialkylene ethane series. The acid radicals may be of aliphatic, aromatic, alicyclic or heterocyclic nature or, for example, radicals of sulfonic acids. Suitable ether radicals are, for example, alkyl-, benzyl-, triarylmethyl- and phenyl-ether groups. These mono-esters or mono-ethers may be prepared by an already known method, e. g. by partial saponification of poly-esters, polyethers or ether-esters, by partial esterification or etherification of free poly-hydroxy compounds having the action of a sex hormone or by reduction of esterified or etherified hydroxy-ketones having the action of a sex hormone.

In the first stage of the process, the starting materials are treated with esterifying agents, suitable for introducing inorganic acid radicals, e. g. with the corresponding inorganic acid itself or its halides, anhydride or esters, e. g. phosphorus oxychloride, phosphorus pentachloride, phosphorus pentoxide, meta-phosphoric acid, chloro-sulfonic acid or boric acid. The ester is prepared by a known method. Condensing agents such as pyridine, quinoline etc. and in some cases diluents may be conveniently used. Schotten-Baumann's method, for example, can also be used.

Finally, the mixed esters containing organic and inorganic acids or the ester-ethers of the poly-hydroxy compound with the action of a sex hormone may be partially split. Hydrolyzing agents, both acid and alkaline, are most suitable for this purpose. Partial splitting can also be carried out by utilizing a re-esterifying method. Certain ether radicals, such as benzyl radicals can be removed conveniently by using reducing agents. In our experiments the surprising observation was made that the inorganic acid radicals, in general, are much more difficult to remove than the organic acid or the ether radicals so that partial elimination of the latter is very easily possible.

Esters prepared by this process which still possess free acid groups can finally be converted if desired into salts. In this way salts which are only slightly soluble in water and others which are easily soluble may be obtained. The latter have a special therapeutic significance because aqueous solutions of these salts can be injected. For the manufacture of the salts, inorganic or organic substances can be used which form salts with acids, e. g. hydroxides or carbonates of the alkalis, alkaline earths and ammonia, or amines such as diethylamine, ethylenediamine, mono-, di- and triethanolamine, piperidine, etc.

The new process has the advantage over the processes which utilize direct partial esterification with inorganic esterifying agents or partial saponification of poly-esters of inorganic acids and also over the reduction of inorganic esters of hydroxy-ketones, in giving better yields; it leads, in contrast to the last named process, to sterically uniform products.

The following examples illustrate the invention, but are not to be regarded as limiting it in any way, the parts being by weight.

*Example 1*

1.7 parts of phosphorus oxychloride are dissolved in 10 parts of pyridine at —10° C. To this solution is added at —10° C. a solution of 1.9 parts of estradiol-3-monobenzoate in 10 parts of pyridine which has also been cooled to —10° C. The reaction mixture is allowed to stand for one hour at —10° C., moisture being excluded; pyridine hydrochloride is gradually deposited. The mixture is slowly poured into ice, stirring continuously, and finally a saturated solution of sodium bicarbonate added until the mixture has an alkaline reaction to litmus. The whole is shaken up several times with ether to remove the pyridine and traces of unchanged starting material. The aqueous solution, which contains the estradiol-3-benzoate-17-primary-mono-phosphate, is made acid to congo with hydrochloric acid, then 5 per cent. of its volume of concentrated hydrochloric acid are added, and the whole is allowed to stand overnight at room temperature for the benzoic acid radical in the 3-position to be hydrolyzed. The colorless, voluminous precipitate is filtered off with suction and dried, and the benzoic acid extracted with warm ether. The ether solution gives, on evaporating down, 0.65 part of crude benzoic acid.

The part which is insoluble in ether is dissolved in acetone, the solution filtered with animal charcoal and evaporated down in vacuo. The residue represents on titration in aqueous suspension with N/10 caustic soda up to the end-point with methyl-orange, and then with phenolphthalein, already a practically pure primary 17-monophosphoric acid ester of estradiol. It can be precipitated from an aqueous solution of alkali carbonates or alkali hydroxides by the addition of hydrochloric acid. The product, after recrystallization, melts at 216–217° C.

Instead of estradiol-3-monobenzoate, another estradiol-3-mono-ester can be used, e. g. the acetate, propionate, hexahydrobenzoate or toluenesulfonate or an estradiol-3-mono-ether such as the triphenylmethyl-ether or the benzyl-ether. If the last named is used, reducing agents e. g. bisulfite salts may be used instead of acid agents for the subsequent splitting.

The primary 17-mono-phosphoric acid ester obtained may subsequently be converted into any salt.

For the preparation of the mono-sodium salt, for instance, the following method is adopted; to 1 part of the ester mentioned, a slight excess (above the calculated quantity) of sodium bicarbonate solution is added and the mixture warmed until solution is complete. The filtered solution is cooled, the precipitated mono-sodium salt of the primary 17-monophosphoric acid ester of estradiol sucked off and washed with a little cold water.

The ethanol amine salt can be prepared, for example, by dissolving one part of the 17-monophosphoric acid ester in hot alcohol and adding somewhat more than the calculated quantity of ethanol amine. The white crystals, which are almost insoluble in alcohol are filtered off with suction and washed with ethanol. They show an unsharp melting point at 175–205° C.

Solutions of the tri-ethanol-amine salt can be prepared, for example, by shaking up one part of the 17-mono-phosphoric acid ester with a solution of somewhat more than the calculated quantity of tri-ethanol-amine in water, when the ester easily goes into solution. The alkaline solution can be neutralized by saturating, for instance, with carbon dioxide.

*Example 2*

1.7 parts of phosphorus oxychloride are dissolved in 10 parts of pyridine at —10° C. To this solution is added a solution of 2 parts estradiol-17-monopropionate, also cooled to —10° C. The mixture is worked up in a manner exactly analogous to that described in Example 1. In this way estradiol-3-primary-monophosphate-17-propionate is obtained. The product, on recrystallization from a mixture of acetone and ether, shows an unsharp melting point at 185–187° C., after previous sintering.

Instead of the acid hydrolysis described in Example 1, alkaline agents may also be used for the partial saponification of the radical in the 17-position. For example, the propionic acid-phosphoric acid-diester is dissolved in 2N-soda solution and the solution heated for one hour at 80–90° C. The cooled solution is then acidified with hydrochloric acid and worked up as described in Example 1 to the primary 3-monophosphoric acid ester of estradiol.

In a similar way other 3- or 17-mono-esters of inorganic acids of estradiol can be prepared e. g. secondary phosphates, primary or secondary sulphates etc.

The phosphoric acid ester described can be converted into its mono-sodium salt in the same way as the 17-ester. Any other salts e. g. dialkali salts can also be prepared. The calcium salt may be obtained, for example, by suspending one part of the phosphoric acid ester in 20 parts of water and shaking with a solution of 3 parts calcium acetate in 10 parts water. Instead of salts with inorganic bases, salts with organic bases such as mono-ethanol amine, di-ethanol-amine or tri-ethanol-amine, pyridine, quinoline, piperidine or trimethylamine can also be prepared.

*Example 3*

2 parts Δ⁵-androstene-3:17-diol-3-monoacetate are reacted with phosphorus oxychloride in pyridine as described in Example 2. The 3-acetate-17-primary-mono-phosphate obtained is partially hydroyzed with soda solution and the primary 17-mono-phosphoric acid ester of androstenediol thus obtained. The latter may be converted by a known method, using oxidizing or dehydrogenating agents, into the primary testosterone-17-phosphoric acid ester or its salts.

The sulfates or borates, for example, of androstenediol, or their salts can be obtained in a similar way. It is possible to start from 3-monotriphenyl-methylether, for example, instead of from androstene-diol-3-monoacetate, carrying out the partial hydrolyzation with acid agents.

If instead of the 3-mono-derivatives of androstenediol the corresponding 17-mono-derivatives are used, the 3-mono-esters of androstene-diol containing organic acid radicals or their salts are obtained.

*Example 4*

1.7 parts chloro-sulfonic acid are dissolved at —10° C. in 10 parts dimethylaniline. To this solution is added a solution of 2 parts diethylstilboestrol monobenzoate of melting point 140–141° C. (prepared for example, by partial esterification of diethyl-stilboestrol with benzoic anhydride in boiling pyridine) in 10 parts dimethylaniline, which has also been previously cooled. After standing for 1 hour, the reaction mixture is slowly poured into ice, stirring continuously, and sodium carbonate then added until a concentration of the same of 10 per cent. is obtained. The solution is extracted several times with ether and then heated for 1 hour to 80° C. After cooling, the mixture is acidified with hydrochloric acid and the flocculent sodium salt of the primary diethyl-stilboestrol-monosulfate completely precipitated by the addition of common salt.

In a similar way, the monophosphates derived from diethyl-stilboestrol or similar polyhydroxy compounds of the stilbene or diphenylhexane series or their salts are obtained.

What we claim is:
1. A steroid ester of the formula

wherein R stands for a radical containing a cyclopentanopolyhydrophenanthrene nucleus bearing the substituent X in one of the positions 3 and 17 and the substituent Y in the other of the said positions, and wherein X stands for a member of the group consisting of free OH and OH esterified with an organic acid, and Y stands for OH esterified with phosphoric acid; and the salts of the said steroid ester.

2. A phosphoric acid ester of estradiol, the phosphoric acid ester group being in one of the positions 3 and 17.

3. A phosphoric acid ester of androstenediol, the phosphoric acid ester group being in one of the positions 3 and 17.

4. The 3-monophosphate of androstenediol.
5. The 3-monophosphate of estradiol.
6. The 17-monophosphate of estradiol.

KARL MIESCHER.
CHARLES MEYSTRE.